US008707020B1

(12) United States Patent
Lengyel et al.

(10) Patent No.: US 8,707,020 B1
(45) Date of Patent: Apr. 22, 2014

(54) SELECTIVE EXPOSURE OF FEATURE TAGS IN A MACSEC PACKET

(75) Inventors: Gabor Lengyel, Half Moon Bay, CA (US); Ramana Devarapalli, San Jose, CA (US); Liang-Chih Yuan, Sunnyvale, CA (US)

(73) Assignee: ClearCrypt, Inc., Santa Clara, CA (US)

( * ) Notice: Subject to any disclaimer, the term of this patent is extended or adjusted under 35 U.S.C. 154(b) by 447 days.

(21) Appl. No.: 12/779,803

(22) Filed: May 13, 2010

(51) Int. Cl.
*H04L 29/00* (2006.01)

(52) U.S. Cl.
USPC ............ 713/150; 713/151; 713/154; 370/252

(58) Field of Classification Search
USPC ........................... 713/150, 151, 154; 370/252
See application file for complete search history.

(56) References Cited

U.S. PATENT DOCUMENTS 7,729,276 B2 * 6/2010 Akyol .......................... 370/252
7,814,329 B1 10/2010 Hutchison et al.
7,853,691 B2 12/2010 Elzur et al.
2010/0174901 A1 7/2010 Khermosh et al.

OTHER PUBLICATIONS

Gunther Lackner/"Master Thesis—IEEE 802.11 Layer 2 Adress Spoofing Protection" /Oct. 25, 2008/pp. 1-101.*
MACSec 802.1ae Standard, IEEE Standard for Local and Metropolitan Area Networks, Media Access Control (MAC) Security, IEEE Computer Society, Aug. 18, 2006, pp. 1-142.
MACSec 802.1x, IEEE Standard for Local and Metropolitan Area Networks, Port-Based Network Access Control, IEEE Computer Society, Feb. 5, 2010, pp. 1-205.

* cited by examiner

*Primary Examiner* — Brandon Hoffman
*Assistant Examiner* — Michael D Anderson
(74) *Attorney, Agent, or Firm* — Kenta Suzue; Haynes Beffel & Wolfeld LLP

(57) ABSTRACT

A MACSec packet exposes selected tags in front of the MACSec tag. Different embodiments are directed to methods and apparatuses of various network nodes, that send, forward, and receive packets. Anther embodiment is the MACSec data structure on a computer readable medium. Another embodiment is the upgrade process of a legacy network.

19 Claims, 12 Drawing Sheets

SELECTIVE EXPOSURE OF FEATURE TAGS IN A MACSEC PACKET

BACKGROUND

This technology relates to extending the IEEE MACSec standard 802.1AE, which specifies a security solution for layer 2. MACSec provides port-based network access control to regulate access to the network and allow only authenticated devices on the LAN; provides peer authentication, data integrity and confidentiality (encryption); and guards against transmission and reception by unidentified or unauthorized parties, and consequent network disruption, theft of service, or data loss. However, despite IEEE approval of the MACSec standard in 2006, practical application of the MACSec standard by the networking community has been slow. One reason for slow adoption has been the absence from the MACSec standard of important features such as key management.

Improvements to IEEE standard 802.1X (IEEE 802.1X-REV, IEEE 802.1X-2010) define client authentication, data integrity checking, and key management (creation, distribution, deletion, and renewal). The adoption of MACSec into IEEE standard 802.1X allows MACSec enabled devices to encrypt data on each hop of the LAN to help completely secure the network.

Despite this marriage of MACSec with IEEE standard 802.1X, slow adoption of the MACSec standard has also resulted from incompatibility of MACSec with legacy devices, as discussed below in connection with FIG. 1. Such incompatibility worsens a tendency of the networking community to adopt advantageous technologies such as MACSec incrementally at best, owing to the enormous investment represented by legacy network infrastructure.

SUMMARY

This technology relates to extending the IEEE MACSec standard 802.1AE. More particularly, it includes systems and methods for MACSec packets with network feature tags exposed before the MACSec tag. Particular aspects of the present invention are described in the claims, specification, and drawings.

Different embodiments are directed to methods and apparatuses of various network nodes that send, forward, and receive packets. Another embodiment is the MACSec data structure on a computer readable medium. Another embodiment is the upgrade process of a legacy network.

DETAILED DESCRIPTION

This technology relates to extending the IEEE MACSec standard 802.1AE, which specifies a security solution for layer 2. Because various sources in the literature count a different number of networking layers, the following discussion clarifies the 5 layer convention used herein, including the claims.

Layer 1 is the physical layer, which performs encoding, transmission, reception and decoding, of the physical signals, whether they are electrical, optical, magnetic, electromagnetic, etc.

Layer 2 is the link layer, or network interface layer, which performs logical link control such as multiplexing and flow control, and media access control such as addressing and channel access control. Examples are Address Resolution Protocol, and Virtual Local Area Network.

Layer 3 is the internet layer, which transports packets across network boundaries, but provides only best effort, unreliable delivery. Examples are Internet Protocol, Internet Group Management Protocol, and Internet Control Message Protocol.

Layer 4 is the transport layer, provides end-to-end communication across a network between application programs. Various features include reliable transport in order, and congestion avoidance. Examples are Transmission Control Protocol, User Datagram Protocol, and Resource ReSerVation Protocol (RSVP).

Layer 5 is the application layer, which is the highest layer and uses application programs. Examples are Dynamic Host Configuration Protocol, Domain Name System, Simple Mail Transfer Protocol, Simple Network Management Protocol, and Transport Layer Security/Secure Socket Layer.

Figure 1:
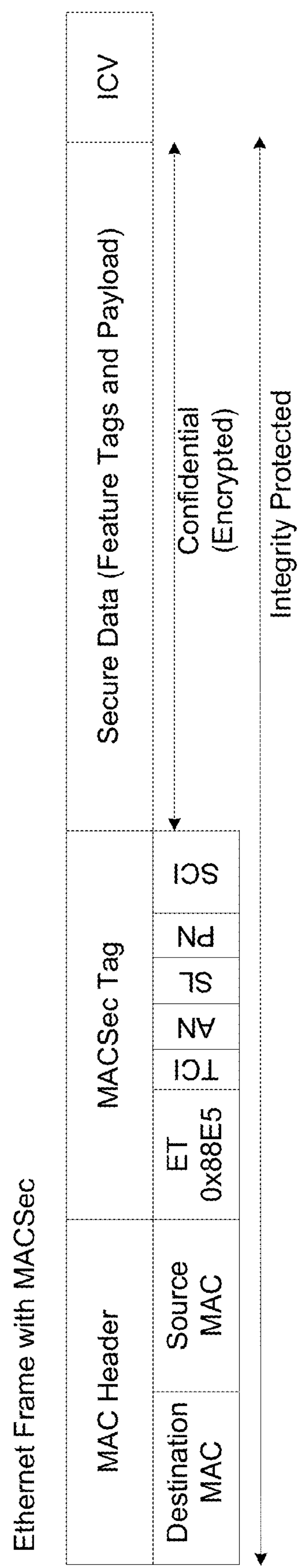
FIG. 1 shows a data structure of an Ethernet frame fully compliant with the IEEE MACSec standard 802.1AE.

FIG. 1 shows a data structure of an Ethernet frame fully compliant with the IEEE MACSec standard 802.1AE.

IEEE MACSec standard 802.1AE is incorporated by reference. IEEE MACSec standard 802.1X is incorporated by reference. Such incorporations by reference include the multiple versions and updates, including but not limited to 802.1X-2001, 802.1X-2004, 802.1X-2010, and 802.1X-REV.

The Ethernet frame begins with a source and destination MAC tag, and is followed by the MACSec tag. The MACSec Protocol Data Unit (MPDU) begins with the MACSec tag, continues with user data including additional tags and payload, and ends with the ICV. The MAC service data unit (MSDU) includes the user data including additional tags and payload, and excludes the MACSec tag and ICV of the MPDU. The MSDU is confidential (encrypted).

The various parts of the MACsec tag, some of which are optional, are discussed as follows.

The MACSec Ethertype value of 0x88E5 identifies the tag as a MACSec tag, and identifies the packet as having MACSec encapsulation.

The TAG Control Information (TCI) includes any of: the MACSec version number, a MAC Source Address parameter to convey the Secure Channel Identifier (SCI), and a parameter for the explicitly encoded SCI, use of the Ethernet Passive Optical Network (EPON) Single Copy Broadcast capability, extraction of the User Data from MACSec Protocol Data Units (MPDUs) by systems that do not possess the Secure Association Key (SAK) when confidentiality is not being provided, and determination of whether confidentiality or integrity alone are in use.

The Association Number (AN) identifies up to four different Secure Associations (SAs) within the context of a Secure Channel (SC).

The Short Length (SL) is the set to the number of octets in the Secure Data field if that number is less than 48.

A Packet Number (PN) provides a unique IV PDU for all MACSec Protocol Data Units (MPDUs) transmitted using the same Secure Association (SA) portion, and supports replay protection.

A Secure Channel Identifier (SCI) encodes the System Identifier component, a globally unique MAC address uniquely associated with the transmitting MAC Security Entity (SecY); and a Port Identifier component of the SCI.

An Integrity Check Value (ICV) provides data integrity services, and is sent with the protected data unit, to be recalculated and compared by the receiver to detect data modification. The ICV is calculated based on the remainder of the packet. The ICV is secure, because the key used to calculate the ICV is not public. This is in contrast to, for example, an Ethernet cyclic redundancy check (CRC) checksum with a publicly known generator polynomial.

Figure 2:
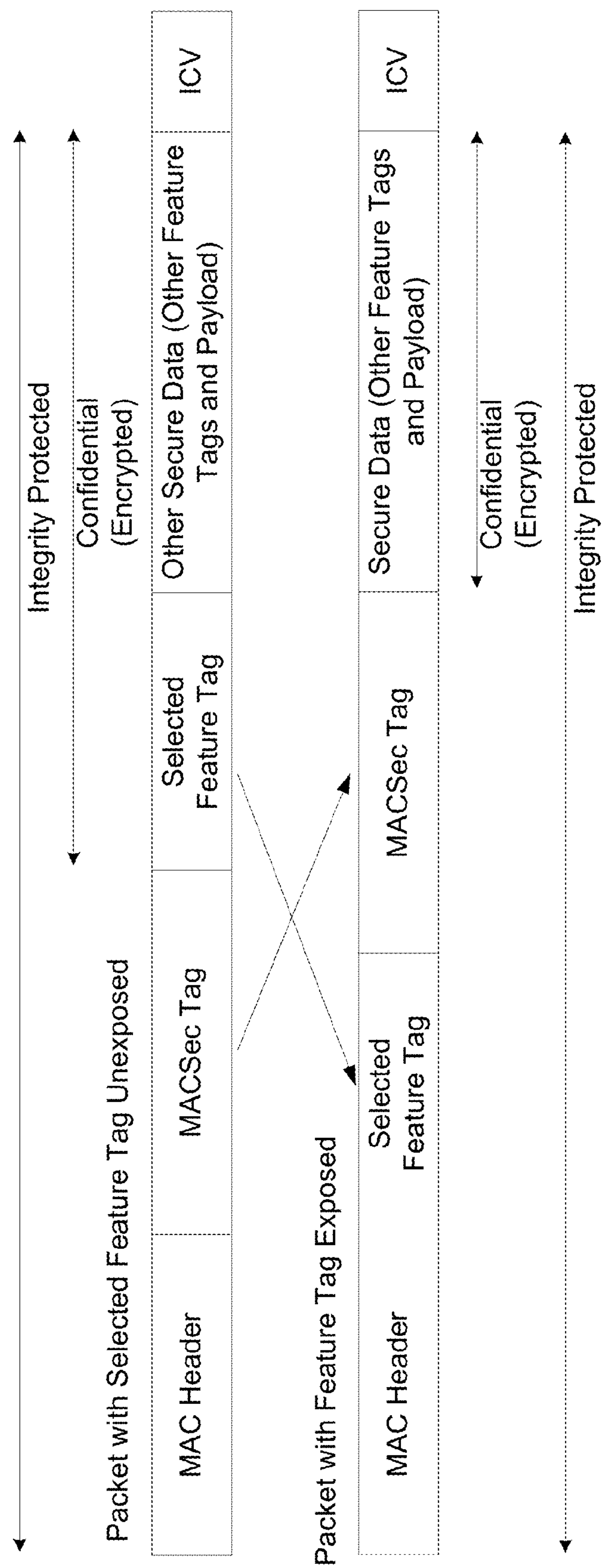
FIG. 2 shows a modified data structure of an Ethernet frame that extends the IEEE MACSec standard 802.1AE.

FIG. 2 shows a modified data structure of an Ethernet frame that extends the IEEE MACSec standard 802.1AE.

A selected feature tag is moved from behind the MACSec tag to in front of the MACSec but behind the MAC header. (Expressed differently, the MACSec tag is moved behind the selected feature tag). In the modified packet, because the selected MACSec tag is behind the selected feature tag, the selected feature tag is no longer confidential. However, because the selected feature tag is still included in the calculation of the ICV, the integrity of the selected feature tag remains protected.

Figure 3:
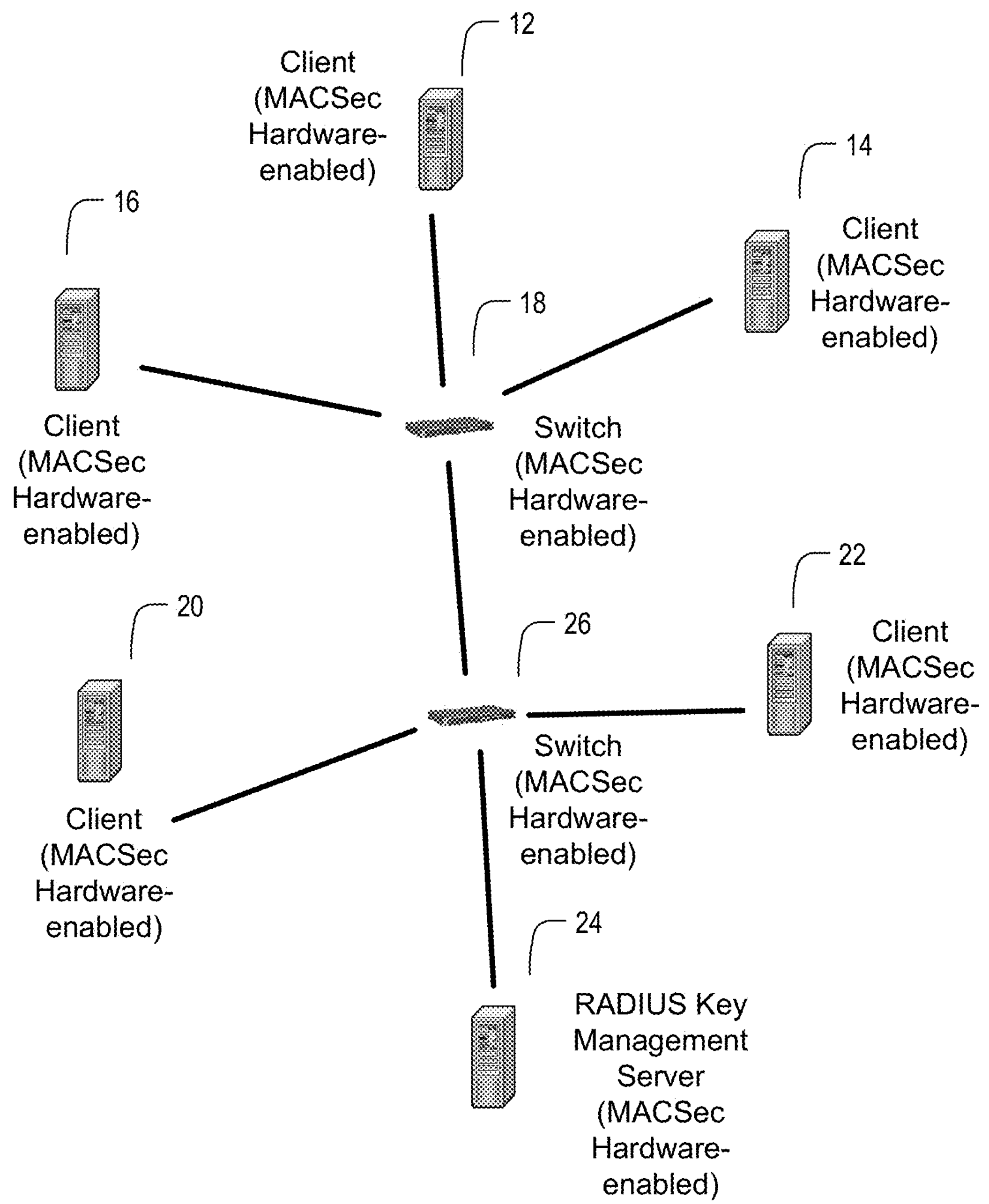
FIG. 3 shows an example network with complete MACSec hardware-enabled support throughout the network.

FIG. 3 shows an example network with complete MACSec hardware-enabled support throughout the network.

In FIG. 3, the clients, key server, and switches are all MACSec hardware enabled. Clients 12, 14, and 16 are connected to switch 18. Clients 20 and 22 and Key Server 24 are connected to switch 26. Switches 18 and 26 are connected.

In the network of FIG. 3, every node is MACSec-enabled, and the MACSec packet structure of FIG. 1 is followed. However, even in such a network, additional devices (not shown) benefit from the extended MACSec packet structure of FIG. 2. For example, network analysis devices such as a packet analyzer or intrusion-detection device without MACSec capability, and other network devices such as transparent firewalls, traffic shapers, load balancers, and WAN optimizers without MACSec capability, are otherwise rendered blind, because the only data available is the MAC address header and the MACSec tag.

Also, layer 2 networks that are entirely MACSec-enabled but separated by a network at layer 3 or higher will benefit from the extended MACSec packet structure, as discussed in connection with FIGS. 7-9.

Although the key server is shown separately, in this and other embodiments, the key server may be on any client or endpoint, or gateway.

Figure 4:
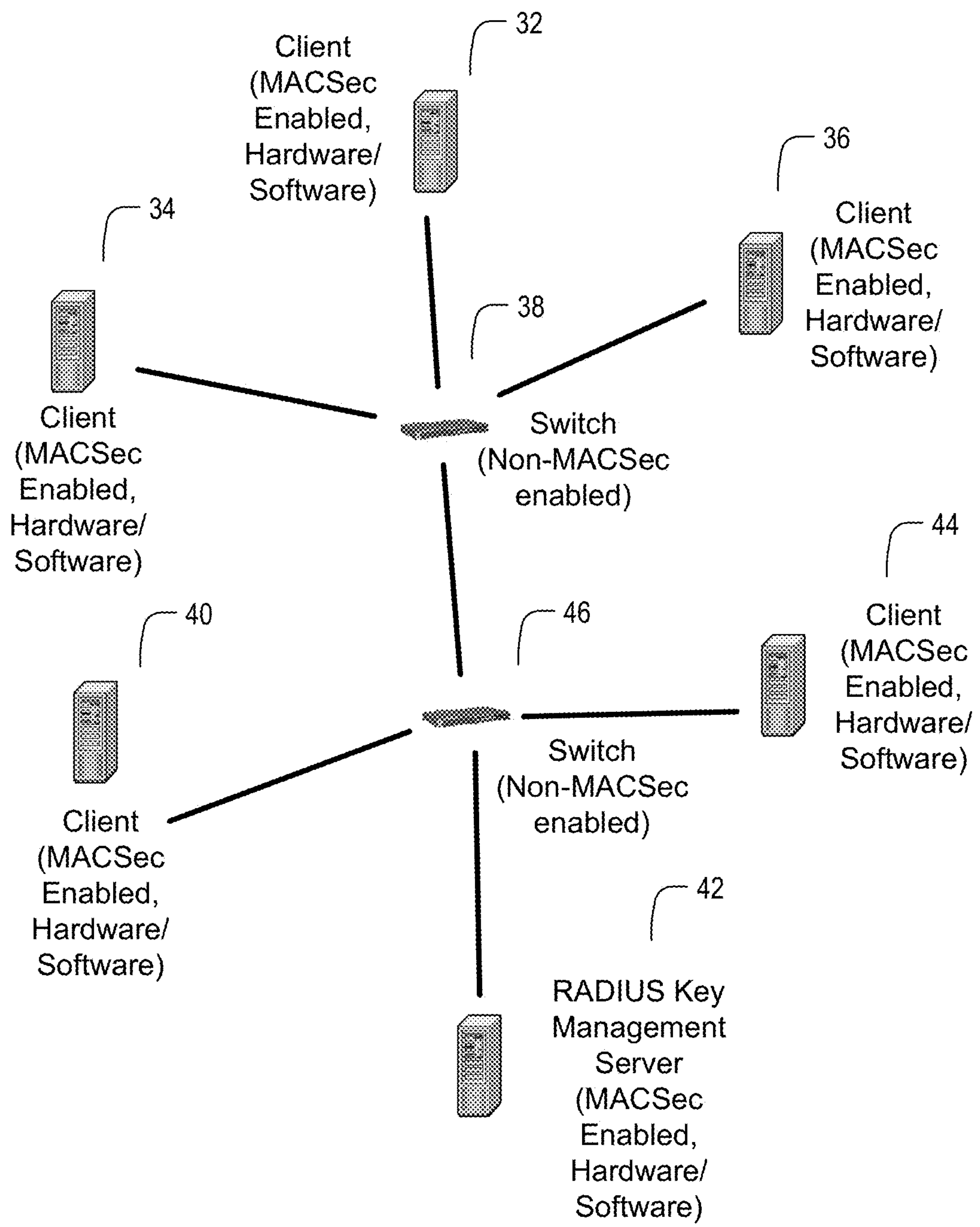
FIG. 4 shows an example legacy network improved with partial MACSec support.

FIG. 4 shows an example legacy network improved with partial MACSec support.

In FIG. 4, the switches are not MACSec enabled, and the clients and the key server are MACSec enabled, either by hardware or software (in either case, MACSec logic). Whereas the network of FIG. 3 represents an ideal network with all network nodes having hardware MACSec capability, the network of FIG. 4 represents a practical solution that uses MACSec on a legacy network without replacing the entire legacy infrastructure.

Clients 32, 34, and 36 are connected to switch 38. Clients 40 and 44 and key server 42 are connected to switch 46. Switches 48 and 46 are connected.

One embodiment of the technology describes an incremental upgrade process from a legacy network, via the network of FIG. 4, to the network of FIG. 3.

Figure 5:
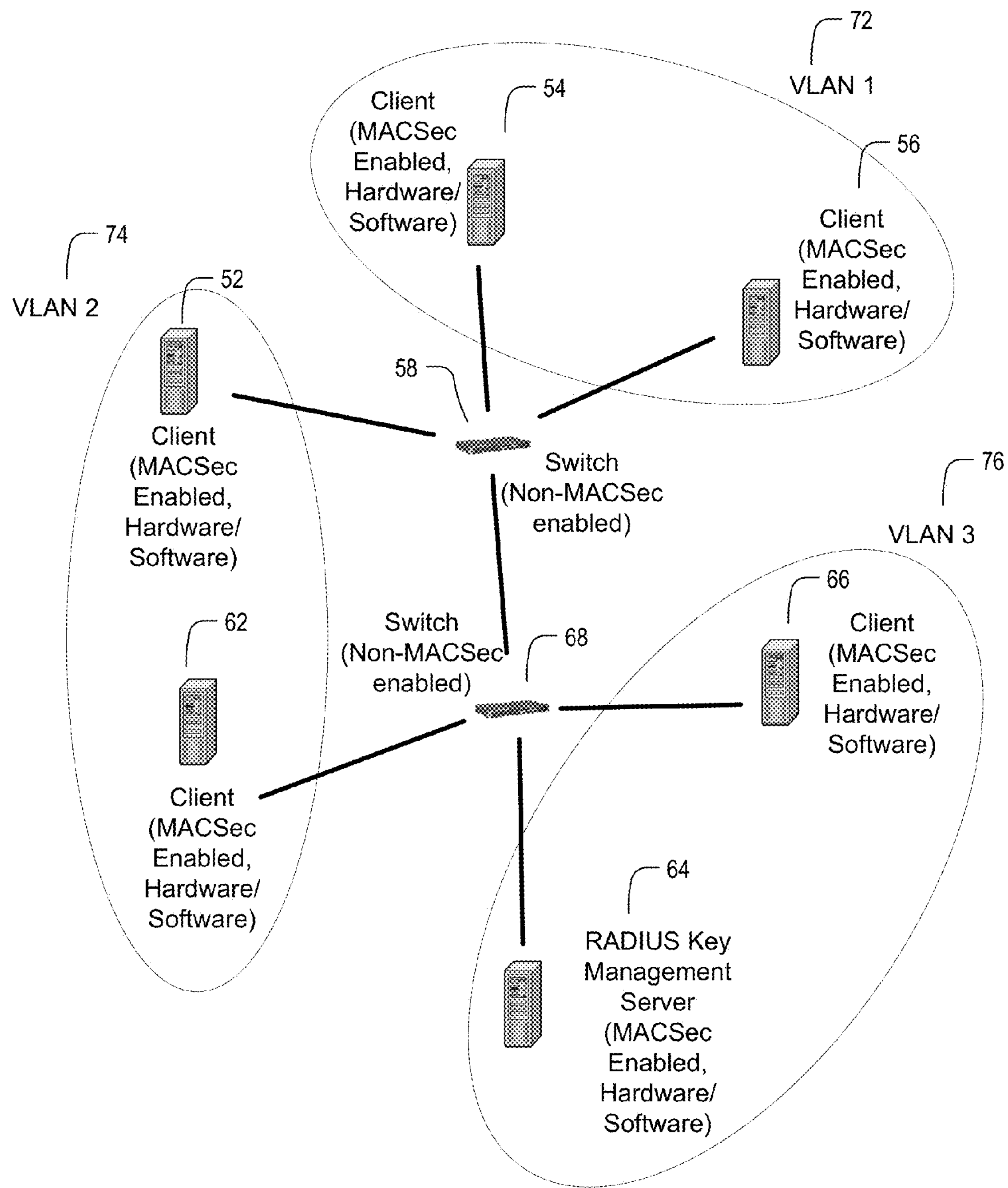
FIG. 5 shows an example network improved with the MACSec extension of FIG. 2, exposing the VLAN tag.
Figure 6:
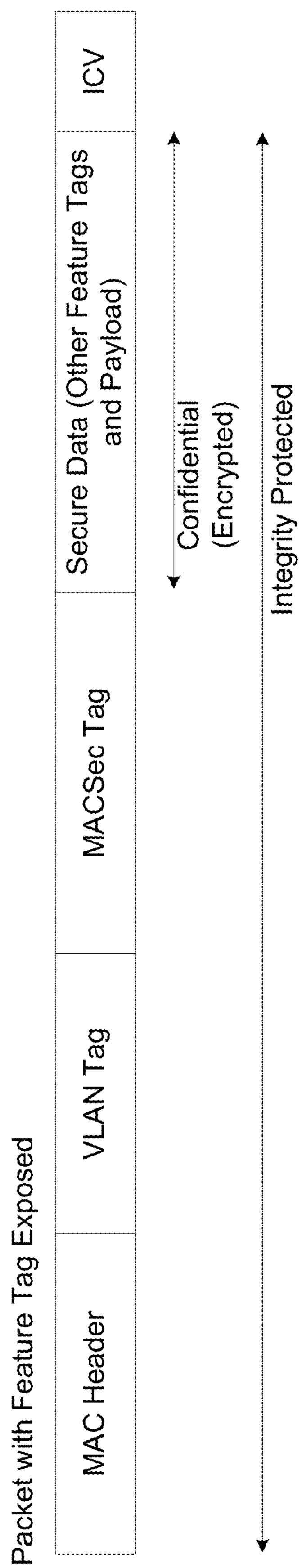
FIG. 6 shows the MACSec extension of FIG. 2, exposing the VLAN tag, which can be used in the exemplary network of FIG. 5.

FIGS. 5 and 6 together show a practical application of the extended MACSec packet structure of FIG. 2.

FIG. 5 shows an example network, such as the network of FIG. 4 with incomplete MACSec implementation, improved with the MACSec extension of FIG. 2, exposing the VLAN tag.

Clients 52, 54, and 56 are connected to switch 58. Clients 62 and 66 and key server 64 are connected to switch 68. Switches 48 and 46 are connected, and neither is MACSec enabled.

In FIG. 5, three Virtual Local Area Networks are defined. VLAN 1 72 includes clients 54 and 56. VLAN 2 74 includes clients 52 and 62. VLAN 3 76 includes client 66 and key server 64. Because the switches 58 and 68 are not MACSec enabled, VLANs would be typically not possible. In the MACSec packet structure of FIG. 1, the VLAN tag is positioned behind the MACSec tag, and therefore the VLAN tag is encrypted and inaccessible to the switches 58 and 68.

FIG. 6 shows the MACSec extension of FIG. 2, exposing the VLAN tag, which can be used in the exemplary network of FIG. 5. Because the VLAN tag is exposed in front of the MACSec tag, the switches 58 and 68 in FIG. 5 have access to the VLAN tag, despite the switches 58 and 68 lacking MACSec capability. Accordingly, the network of FIG. 5 implements MACSec despite having switches lacking MACSec capability.

Figure 7:
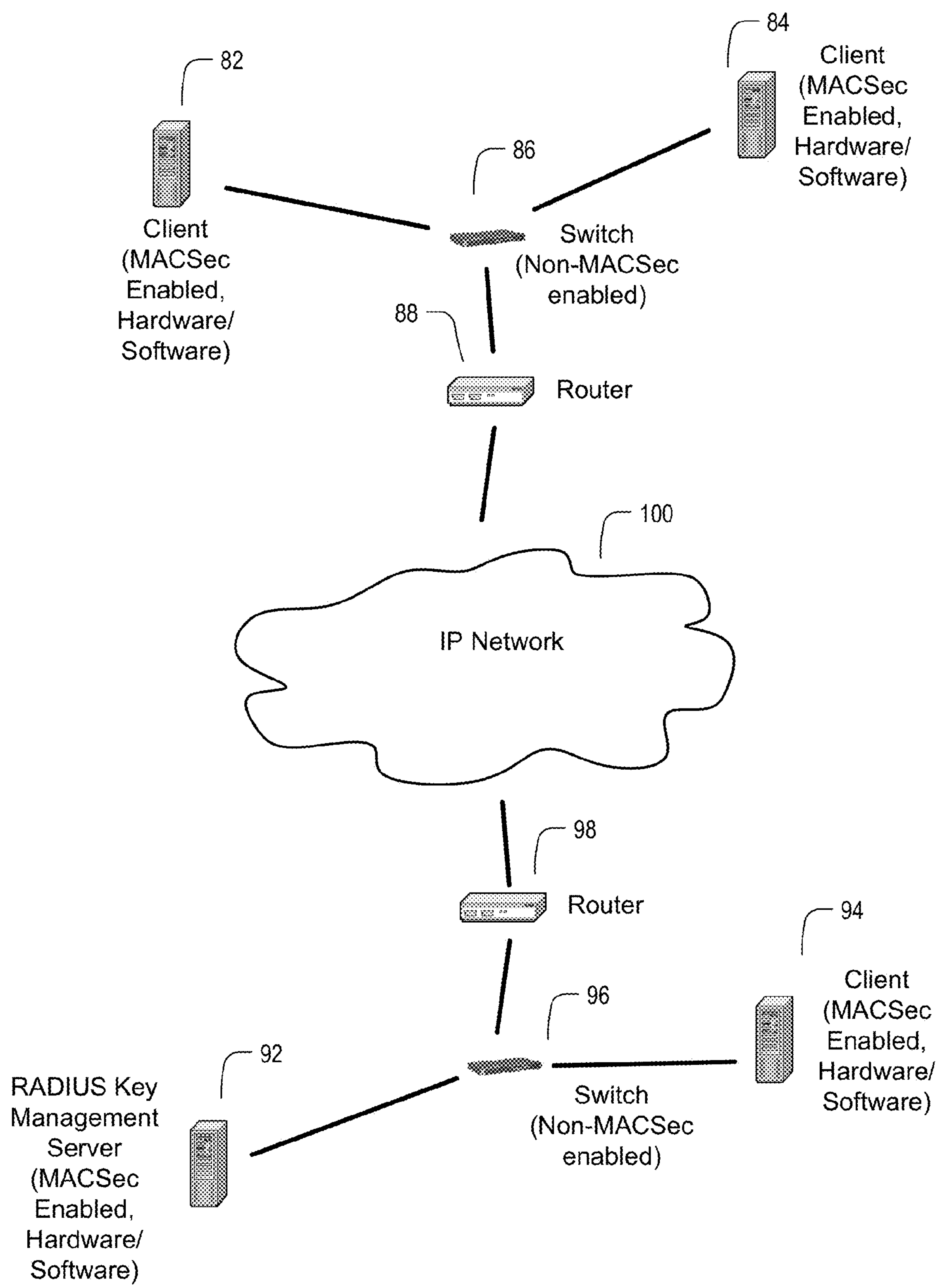
FIG. 7 shows an example network improved with the MACSec extension of FIG. 2, exposing the IP tag.
Figure 8:
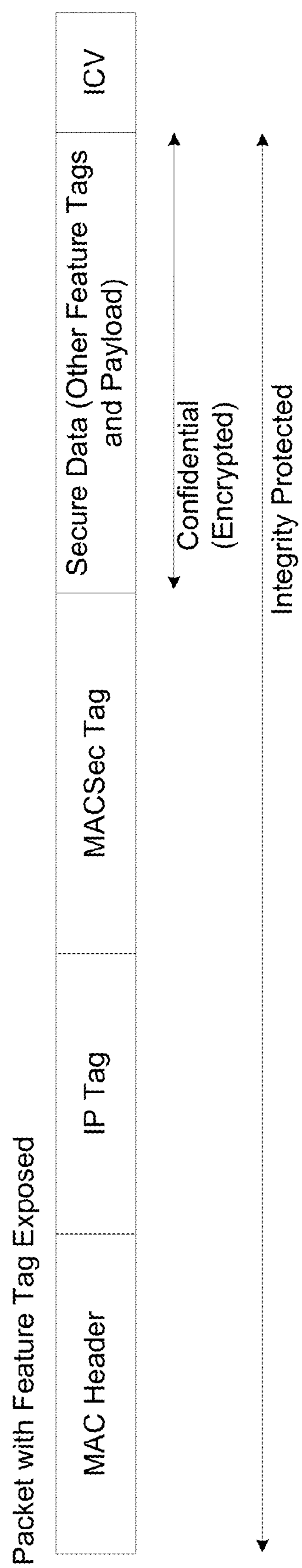
FIG. 8 shows the MACSec extension of FIG. 2, exposing the IP tag, which can be used in the exemplary network of FIG. 7.

FIGS. 7 and 8 together show another practical application of the extended MACSec packet structure of FIG. 2.

FIG. 7 shows an example network improved with the MACSec extension of FIG. 2, exposing the IP tag.

In FIG. 7, multiple layer 2 networks are separated by a layer 3 network. The multiple layer 2 networks are separated in that layer 2 features alone cannot propagate packets between the multiple layer 2 networks. Instead, a layer 2 packet of one layer 2 network must be modified into a higher layer packet, in this case a layer 3 packet, propagated across the higher layer network, in this case a layer 3 network, and modified again into a layer 2 packet to be received at another layer 2 network.

Clients 82 and 84 are connected to a switch 86. The switch 86 is connected via a router 88 to an IP network 100. Client 94 and key server 92 are connected to a switch 96. The switch 96 is connected via a router 98 to an IP network 100. The IP network 100 is a higher layer network, in this case a layer 3 network, separating two layer 2 networks.

Although a layer 2 network is shown as multiple nodes, the layer 2 network may be a single node, such as a remote client.

FIG. 8 shows the MACSec extension of FIG. 2, exposing the IP tag, which can be used in the exemplary network of FIG. 7.

Figure 9:
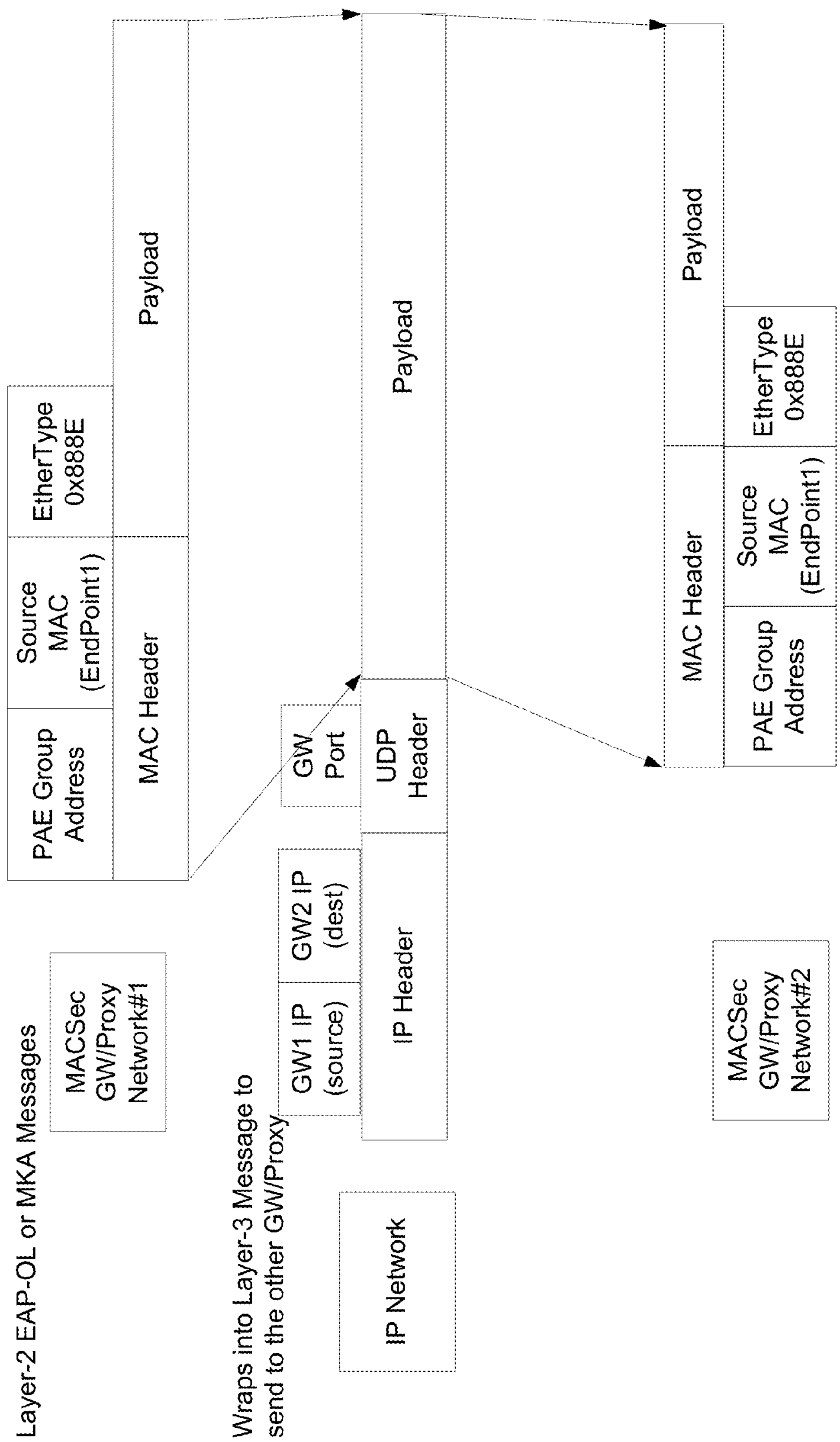
FIG. 9 shows a modified data structure of an Ethernet frame that extends the IEEE standard 802.1X authentication standard, which can be used in the exemplary network of FIG. 7.

FIG. 9 shows a modified data structure of an Ethernet frame that extends the IEEE standard 802.1X authentication standard, which can be used in the exemplary network of FIG. 7.

A layer 2 key management broadcast packet from layer 2 network #1 is received at a gateway of layer 2 network #1. The gateway wraps the layer 2 key management broadcast packet with an IP header. After the IP key management packet transits the layer 3 IP network and reaches the gateway of layer 2 network #2, the layer 3 wrapper is discarded, and the layer 2 key management broadcast packet reaches the nodes of layer 2 network #2.

Accordingly, key broadcast messages are broadcast in not just one layer 2 network, but throughout multiple layer 2 networks. An embodiment with the modified data structure of FIG. 9 allows the use of common key management in multiple layer 2 networks, such as in FIG. 7. Despite being separated into multiple layer 2 networks, a single security domain exists, within which key management messages are broadcast throughout the multiple layer 2 networks, such that the same key can be used throughout the security domain, and packets are not required to undergo multiple encryptions and decryptions. Other security protocols such as VPN, IPSec and TLS are redundant within the single security domain. Some embodiments rely only on MACSec but not such other security protocols.

The gateway performs the functions of encapsulating the layer 2 packet with a layer 3 header, and deencapsulating the layer 3 packet back into the layer 2 packet. The gateways can be the switches in FIG. 7, or alternatively at another node besides the entry/exit node of the networks.

In one embodiment, the gateway of the upper network of FIG. 7 acts as the proxy for nodes in the low network of FIG. 7, and the gateway of the lower network of FIG. 7 acts as the proxy for nodes in the upper network of FIG. 7.

Figure 10:
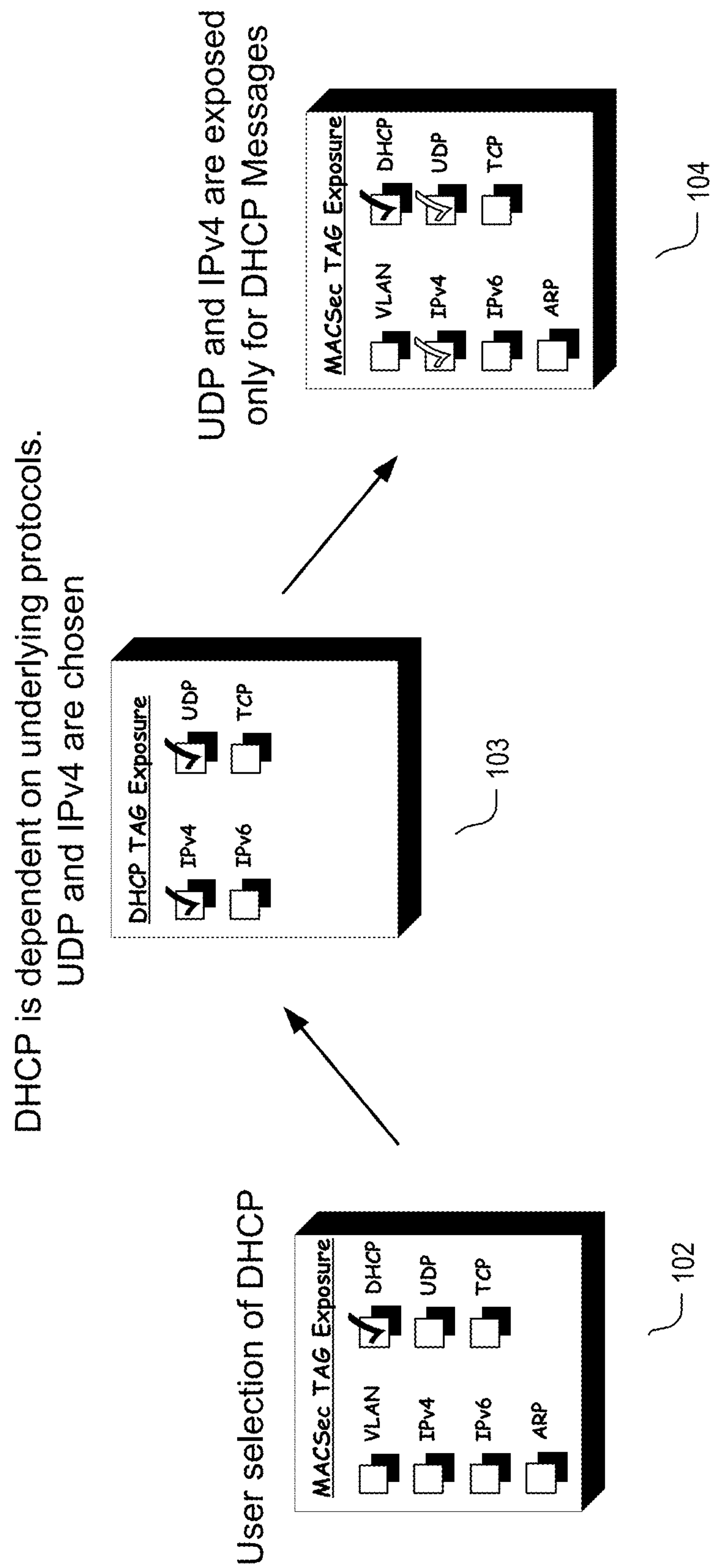
FIG. 10 shows an example of an intelligent GUI for use with the MACSec extension of FIG. 2.

FIG. 10 shows an example of an intelligent GUI for use with the MACSec extension of FIG. 2.

The intelligent GUI of 102 receives user selections of selected tags to expose in a packet in front of the MACSec tag. In response to user selection of the DHCP tag, the underlying logic determines an inconsistency between exposing the DHCP tag, but not exposing the IP and UDP tags. The GUI 103 notifies the user of this inconsistency that DHCP is dependent on the underlying protocols UDP and IPv4. The GUI 104 corrects the user selections accordingly. In one embodiment, the correction is limited to packets with the user selected tag, and does not extend to other packets without the user selected tag. For example, in this embodiment, packets with a DHCP tag also expose the IPv4 and UDP tags, but packets without a DHCP tag also expose neither the IPv4 nor UDP tags. Alternatively, in GUI 102 the user selection can include IPv4 and UDP tags to expose IPv4 and UDP tags regardless of whether the packet includes a DHCP tag.

Figure 11:
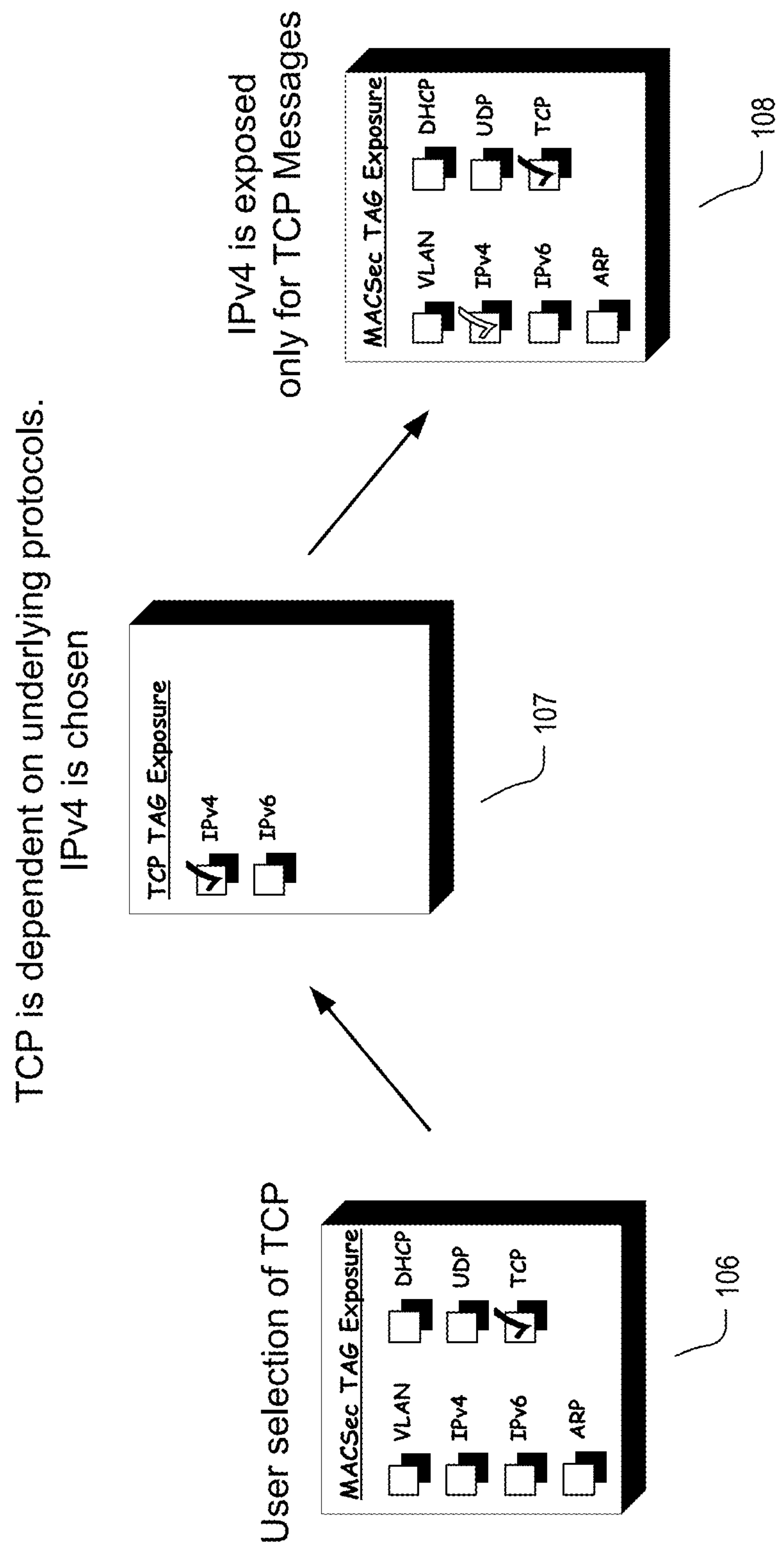
FIG. 11 shows another example of an intelligent GUI for use with the MACSec extension of FIG. 2.

FIG. 11 shows another example of an intelligent GUI for use with the MACSec extension of FIG. 2.

The intelligent GUI of 106 receives user selections of selected tags to expose in a packet in front of the MACSec tag. In response to user selection of the TCP tag, the underlying logic determines an inconsistency between exposing the TCP tag, but not exposing the IP tag. The GUI 107 notifies the user of this inconsistency that TCP is dependent on the underlying protocol IPv4, and corrects the user selections accordingly. In one embodiment, the correction is limited to packets with the user selected tag, and does not extend to other packets without the user selected tag. For example, in this embodiment, packets with a TCP tag also expose the IPv4 tag, but packets without a TCP tag do not expose the IPv4 tag. Alternatively, in GUI 106 the user selection can include the IPv4 tag to expose the IPv4 tag regardless of whether the packet includes a TCP tag.

In FIGS. 10 and 11, such underlying protocols are shown with a different style selection mark than the user selected selection mark, to indicate that the underlying protocols cannot be unchecked without also unselecting the original user selection of the protocol with dependent protocols. As illustrated, the outline checkmarks cannot be removed without also removing the solid checkmarks.

Figure 12:
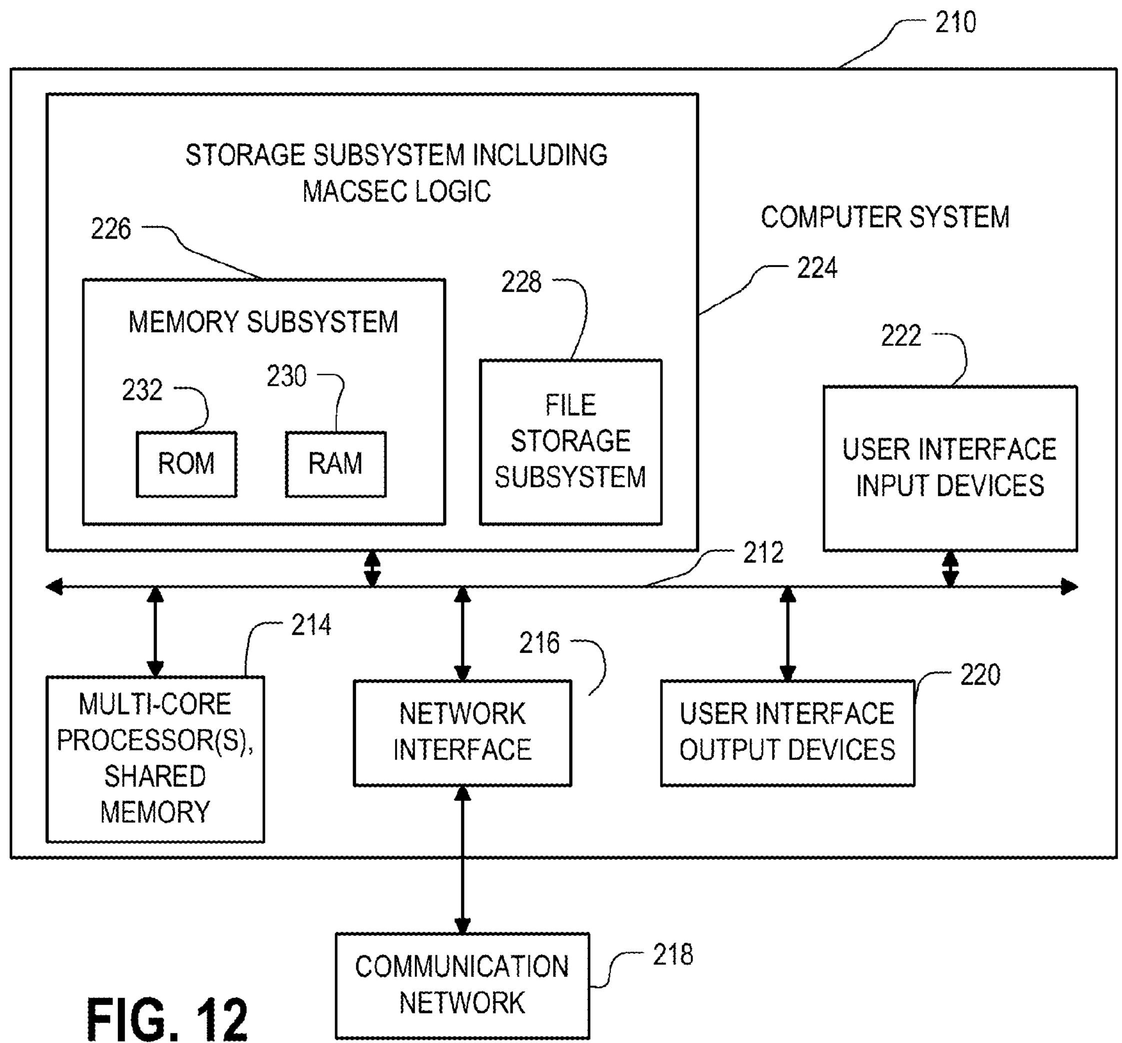
FIG. 12 shows an example network node in a network implementing the MACSec extension of FIG. 2.

FIG. 12 shows an example network node in a network implementing the MACSec extension of FIG. 2.

Computer system 210 typically includes a processor subsystem 214 (optionally with MACSec logic) which communicates with a number of peripheral devices via bus subsystem 212. These peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard.

User interface input devices 222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 210 or onto computer network 218.

User interface output devices 220 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 210 to the user or to another machine or computer system.

Storage subsystem 224 stores the basic programming and data constructs that provide the functionality of certain aspects of the present invention. For example, the various modules implementing the MACSec functionality may be stored in storage subsystem 224. These software modules are generally executed by processor subsystem 214. The data constructs stored in the storage subsystem 224 also can include any data structures and logic mentioned herein. Note that in some embodiments, one or more of these can be stored elsewhere but accessibly to the computer system 210, for example via the communication network 218.

Memory subsystem 226 typically includes a number of memories including a main random access memory (RAM) 230 for storage of instructions and data during program execution and a read only memory (ROM) 232 in which fixed instructions are stored (optionally with MACSec logic, compliant with either the standard or extended MACSec packet structure). File storage subsystem 228 provides persistent storage for program and data files, and may include a hard disk drive, a floppy disk drive along with associated removable media, a CD ROM drive, an optical drive, or removable media cartridges. The logic 280 implementing the functionality of certain embodiments of the invention may have been provided on a computer readable medium including transitory media, and nontransitory media 240 such as one or more CD-ROMs (or may have been communicated to the computer system 210 via the communication network 218), and may be stored by file storage subsystem 228. The host memory 226 contains, among other things, computer instructions which, when executed by the processor subsystem 210, cause the computer system to operate or perform functions as described herein. As used herein, processes and software that are said to run in or on "the host" or "the computer", execute on the processor subsystem 214 in response to computer instructions and data in the host memory subsystem 226 including any other local or remote storage for such instructions and data.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer system 210 itself can be of varying types including a personal computer, a portable computer, a workstation, a computer terminal, a network computer, a television, a mainframe, or any other data processing system or user device. Due to the ever changing nature of computers and networks, the description of computer system 210 depicted is intended only as a specific example for purposes of illustrating the preferred embodiments of the present invention. Many other configurations of computer system 210 are possible having more or less components than the computer system.

Figure 13:
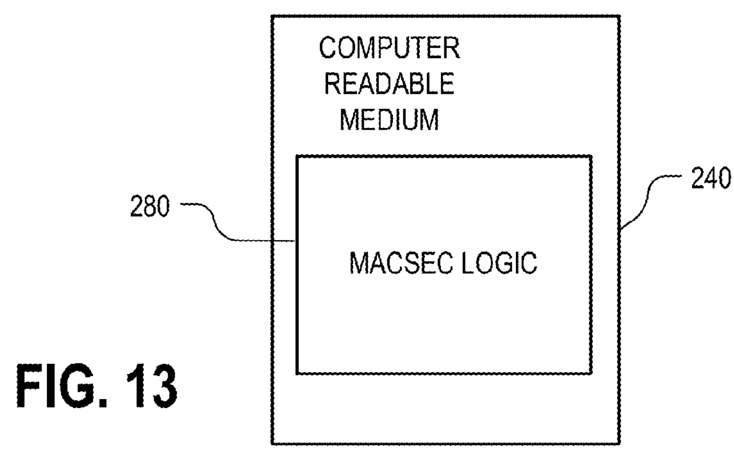
FIG. 13 shows an example computer readable medium with logic implementing the MACSec extension of FIG. 2.

FIG. 13 shows an example computer readable medium with logic implementing the MACSec extension of FIG. 2.

From the preceding description, it will be apparent to those of skill in the art that a wide variety of systems and methods can be constructed from aspects and components of the present invention. Several embodiments use MACSec tags and layer 2 encryption with legacy devices that do not understand MACSec tags, while preserving features controlled by tags supported by the legacy devices when the tags are unencrypted and accessible to the legacy devices.

One embodiment is directed to a sending network node. Selected tags are exposed in a partially encrypted packet. The exposure includes the following sub-steps. A MACSec tag is positioned in the partially encrypted packet after a source and destination MAC tag and the selected tags. Tags and payload of the packet at positions that follow the MACSec tag are encrypted, and the source and destination MAC tag and the selected tags at positions that are before the MACSec tag are not encrypted. In another step, the partially encrypted packet is forwarded via a network path that includes at least one network device that does not support IEEE MACSec standard 802.1AE.

Another embodiment is directed to a receiving network node. A partially encrypted packet is received via a network path that includes at least one network device that does not support IEEE MACSec standard 802.1AE. At least a payload of the partially encrypted packet is decrypted. The decryption includes the following sub-steps. A MACSec tag positioned after the source and destination MAC tag and after selected tags that are supported by the network devices that do not support MACSec tags, is identified. At least the payload of the partially encrypted packet positioned after the MACSec tag, is decrypted.

Another embodiment is directed to an intermediate network node. A partially encrypted packet is received at a legacy network device that does not support IEEE MACSec standard 802.1AE. One or more features are performed at the legacy network device, wherein the features are controlled by one or more selected tags positioned after the source and destination MAC tag and before a MACSec tag in the partially encrypted packet. The partially encrypted packet is forwarded from the legacy network device.

Several embodiments, such as those directed to a sending network node, a receiving network node, and an intermediate network node, may be adapted with various further refinements, as follows. In such embodiments, despite varying from the IEEE MACSec standard 802.1AE by not encrypting the selected tags, the IEEE MACSec standard 802.1AE is followed by including the selected tags positioned before the MACSec tag in calculating a secured data integrity checksum. The MACSec tag includes an Ethertype value of 0x88E5. The MACSec tag also includes other values according to IEEE MACSec standard 802.1AE. Despite the legacy devices not understanding MACSec tags, the legacy devices support processing the features corresponding to the selected tags positioned before the MACSec tag in the partially encrypted packet. Responsive to a TCP payload of a TCP tag being changed by the repositioned MACSec tag, a TCP checksum of the TCP tag is recomputed.

Several embodiments, such as those directed to a sending network node, a receiving network node, and an intermediate network node, may be adapted with various further refinements directed to a GUI, as follows. A graphical user interface with a user selectable list of tags to be exposed to, and supported by, the intermediate devices that do not support MACSec tags and layer 2 encryption, is presented to a user. User preferences about the one or more selected tags are received, from the user via the graphical user interface with the user selectable list of tags to be exposed. There are several alternatives of responding to the user preferences. In one embodiment, the one or more selected tags are determined responsive to the user preferences. In another embodiment, the user is notified via the graphical user interface of an inconsistency between the user preferences and a dependency between multiple tags. In another embodiment, responsive to inconsistency between the user preferences and a dependency between a first tag selected by the user and a second tag not selected by the user, the user is notified via the graphical user interface of a modification to the user preferences to resolve the inconsistency. The modified user preferences position the MACSec tag after the second tag for the partially encrypted packet that includes the first tag. Examples of the inconsistency are user preferences indicating exposure of a TCP tag but not an IP tag, user preferences indicating exposure of a UDP tag but not an IP tag, and user preferences indicating exposure of a DHCP tag but not both an IP tag and a UDP tag. Respectively, the modified user preferences position the MACSec tag after the IP tag for the partially encrypted packet that includes the TCP tag, position the MACSec tag after the IP tag for the partially encrypted packet that includes the UDP tag, and position the MACSec tag after the IP tag and the UDP tag for the partially encrypted packet that includes the DHCP tag.

Several embodiments, such as those directed to a sending network node, a receiving network node, and an intermediate network node, may be adapted with various further refinements directed to key management, as follows. In one embodiment, shared 802.1X key management is performed among multiple layer 2 networks that are separated by an intermediate network. The intermediate network propagates packets through the intermediate network at a higher layer of at least layer 3. The shared 802.1X key management includes the following sub-steps. A layer 2 802.1X key management packet of a first layer 2 network, is encapsulated to include a header of the higher layer to form a higher layer key management packet. The higher layer key management packet is propagated from a first layer 2 network through the intermediate network to a second layer 2 network. The higher layer key management packet is deencapsulated to form the layer 2 802.1X key management packet. In another embodiment, shared 802.1X key management is performed among wired and wireless layer 2 networks.

Yet another embodiment is directed to migration from intermediate network devices that support features controlled by tags but do not support MACSec tags and layer 2 encryption, to intermediate devices that support MACSec tags and layer 2 encryption. Configurable MACSec logic components are deployed on endpoint network devices, wherein the configurable MACSec logic components are adapted to position a MACSec tag in partially encrypted packets so that the MACSec tag follows the source and destination MAC tag and one or more selected tags. The configurable MACSec logic components are initially operated with a configuration that positions one or more selected tags to appear before the MACSec tag in an unencrypted part of the partially encrypted packets, so that the selected tags are accessible to legacy network devices that do not support MACSec tags and layer 2 encryption. Then, the configurable MACSec logic components are reconfigured, to change the positions of the selected tags, so that the selected tags appear after the MACSec tag in an encrypted part of the partially encrypted packets and are accessible to intermediate network devices that support MACSec. The configurable MACSec logic components are operated using the reconfigured positions of the selected tags.

This embodiment may be adapted with various further refinements, as follows. Meaningful data are assigned to the selected tags for processing by intermediate network devices. The legacy network devices are replaced with intermediate network devices that do support MACSec and that are capable of line speed decryption and retrieval of tags from encrypted portions of packets.

Other embodiments are directed to data structures disclosed herein.

In various embodiments that selectively expose tags in a MACSec packet, a combination of one or more of the types of tags are exposed. An embodiment exposes at least one or more tags approved by IEEE. Additional embodiments expose a combination of one or more tags including at least one tag not approved by IEEE, but instead used or approved by another standards organization, company, and/or government.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of using MACSec tags and layer 2 encryption with legacy devices that do not understand MACSec tags, while preserving features controlled by tags supported by the legacy devices when the tags are unencrypted and accessible to the legacy devices, including:

exposing selected tags in a partially encrypted packet, including:

positioning a MACSec tag in the partially encrypted packet after a source and destination MAC tag and the selected tags; and responsive to a TCP payload of a TCP tag being changed by the repositioned MACSec tag, recomputing a TCP checksum of the TCP tag;

encrypting tags and payload of the packet at positions that follow the MACSec tag, and not encrypting the source and destination MAC tag and the selected tags at positions that are before the MACSec tag, performing a calculation of a secured data integrity checksum of the partially encrypted packet, the calculation including the selected tags positioned before the MACSec tag; and forwarding the partially encrypted packet via a network path that includes at least one network device that does not support IEEE MACSec standard 802.1AE.

2. The method of claim 1, wherein despite the legacy devices not understanding MACSec tags, the legacy devices support processing the features corresponding to the selected tags positioned before the MACSec tag in the partially encrypted packet.

3. The method of claim 1, further including:

presenting to a user a graphical user interface with a user selectable list of tags to be exposed to, and supported by, the intermediate devices that do not support MACSec tags and layer 2 encryption;

receiving, from the user via the graphical user interface with the user selectable list of tags to be exposed, user preferences about the one or more selected tags; and determining the one or more selected tags responsive to the user preferences.

4. The method of claim 1, further including:

presenting to a user a graphical user interface with a user selectable list of tags to be exposed to, and supported by, the intermediate devices that do not support MACSec tags and layer 2 encryption;

receiving, from the user via the graphical user interface with the user selectable list of tags to be exposed, user preferences about the one or more selected tags; and notifying the user via the graphical user interface of an inconsistency between the user preferences and a dependency between multiple tags.

5. The method of claim 1, further including:

presenting to a user a graphical user interface with a user selectable list of tags to be exposed to, and supported by, the intermediate devices that do not support MACSec tags and layer 2 encryption;

receiving, from the user via the graphical user interface with the user selectable list of tags to be exposed, user preferences about the one or more selected tags; and responsive to inconsistency between the user preferences and a dependency between a first tag selected by the user and a second tag not selected by the user, notifying the user via the graphical user interface of a modification to the user preferences to resolve the inconsistency, the modified user preferences positioning the MACSec tag after the second tag for the partially encrypted packet that includes the first tag.

6. The method of claim 1, further including:

presenting to a user a graphical user interface with a user selectable list of tags to be exposed to, and supported by, the intermediate devices that do not support MACSec tags and layer 2 encryption;

receiving, from the user via the graphical user interface with the user selectable list of tags to be exposed, user preferences about the one or more selected tags; and identifying an inconsistency between the user preferences and a dependency between multiple tags, wherein the user preferences indicated exposure of a TCP tag but not an IP tag.

7. The method of claim 1, further including:

presenting to a user a graphical user interface with a user selectable list of tags to be exposed to, and supported by, the intermediate devices that do not support MACSec tags and layer 2 encryption;

receiving, from the user via the graphical user interface with the user selectable list of tags to be exposed, user preferences about the one or more selected tags; and responsive to inconsistency between the user preferences and a dependency between multiple tags, wherein the user preferences indicated exposure of a TCP tag but not an IP tag, notifying the user via the graphical user interface of a modification to the user preferences to resolve the inconsistency, the modified user preferences positioning the MACSec tag after the IP tag for the partially encrypted packet that includes the TCP tag.

8. The method of claim 1, further including:

presenting to a user a graphical user interface with a user selectable list of tags to be exposed to, and supported by, the intermediate devices that do not support MACSec tags and layer 2 encryption;

receiving, from the user via the graphical user interface with the user selectable list of tags to be exposed, user preferences about the one or more selected tags; and identifying an inconsistency between the user preferences and a dependency between multiple tags, wherein the user preferences indicated exposure of a UDP tag but not an IP tag.

9. The method of claim 1, further including:

presenting to a user a graphical user interface with a user selectable list of tags to be exposed to, and supported by, the intermediate devices that do not support MACSec tags and layer 2 encryption;

receiving, from the user via the graphical user interface with the user selectable list of tags to be exposed, user preferences about the one or more selected tags; and responsive to inconsistency between the user preferences and a dependency between multiple tags, wherein the user preferences indicated exposure of a UDP tag but not an IP tag, notifying the user via the graphical user interface of a modification to the user preferences to resolve the inconsistency, the modified user preferences positioning the MACSec tag after the IP tag for the partially encrypted packet that includes the UDP tag.

10. The method of claim 1, further including:

presenting to a user a graphical user interface with a user selectable list of tags to be exposed to, and supported by, the intermediate devices that do not support MACSec tags and layer 2 encryption;

receiving, from the user via the graphical user interface with the user selectable list of tags to be exposed, user preferences about the one or more selected tags; and identifying an inconsistency between the user preferences and a dependency between multiple tags, wherein the user preferences indicated exposure of a DHCP tag but not both an IP tag and a UDP tag.

11. The method of claim 1, further including:

presenting to a user a graphical user interface with a user selectable list of tags to be exposed to, and supported by, the intermediate devices that do not support MACSec tags and layer 2 encryption;

receiving, from the user via the graphical user interface with the user selectable list of tags to be exposed, user preferences about the one or more selected tags; and responsive to inconsistency between the user preferences and a dependency between multiple tags, wherein the user preferences indicated exposure of a DHCP tag but not both an IP tag and a UDP tag, notifying the user via the graphical user interface of a modification to the user preferences to resolve the inconsistency, the modified user preferences positioning the MACSec tag after the IP tag and the UDP tag for the partially encrypted packet that includes the DHCP tag.

12. The method of claim 1, further including:

performing shared 802.1X key management among multiple layer 2 networks that are separated by an intermediate network, the intermediate network propagating packets through the intermediate network at a higher layer of at least layer 3.

13. The method of claim 1, further including:

performing shared 802.1X key management among multiple layer 2 networks that are separated by an intermediate network, the intermediate network propagating packets through the intermediate network at a higher layer of at least layer 3, including:

encapsulating a layer 2 802.1X key management packet of a first layer 2 network, to include a header of the higher layer to form a higher layer key management packet;

propagating the higher layer key management packet from a first layer 2 network through the intermediate network to a second layer 2 network; and deencapsulating the higher layer key management packet to form the layer 2 802.1X key management packet.

14. The method of claim 1, further including:

performing shared 802.1X key management among wired and wireless layer 2 networks.

15. A method of using MACSec tags and layer 2 encryption with legacy devices that do not understand MACSec tags, while preserving features controlled by tags supported by the legacy devices when the tags are unencrypted and accessible to the legacy devices, including:

receiving a partially encrypted packet via a network path that includes at least one network device that does not support IEEE MACSec standard 802.1AE; and decrypting at least a payload of the partially encrypted packet, including:

identifying a MACSec tag positioned after the source and destination MAC tag and after selected tags that are supported by the network devices that do not support MACSec tags; and decrypting at least the payload of the partially encrypted packet positioned after the MACSec tag, wherein the partially encrypted packet includes a TCP checksum based on a TCP payload with the MACSec tag being positioned after the source and destination MAC tag and selected tags and, wherein the partially encrypted packet includes a secured data integrity checksum, and calculation of the secured data integrity checksum included the selected tags positioned before the MACSec tag.

16. A method of using MACSec tags and layer 2 encryption with legacy devices that do not understand MACSec tags, while preserving features controlled by tags supported by the legacy devices when the tags are unencrypted and accessible to the legacy devices, including:

receiving a partially encrypted packet at a legacy network device that does not support IEEE MACSec standard 802.1AE;

performing one or more of the features at the legacy network device, wherein the features are controlled by one or more selected tags positioned after the source and destination MAC tag and before a MACSec tag in the partially encrypted packet; and forwarding the partially encrypted packet from the legacy network device, wherein the partially encrypted packet includes a TCP checksum based on a TCP payload with the MACSec tag being positioned after the source and destination MAC tag and selected tags and, wherein the partially encrypted packet includes a secured data integrity checksum, and calculation of the secured data integrity checksum included the selected tags positioned before the MACSec tag.

17. A method of supporting migration from intermediate network devices that support features controlled by tags but do not support MACSec tags and layer 2 encryption, to intermediate devices that support MACSec tags and layer 2 encryption, the method including:

deploying configurable MACSec logic components on endpoint network devices, wherein the configurable MACSec logic components are adapted to position a MACSec tag in partially encrypted packets so that the MACSec tag follows the source and destination MAC tag and one or more selected tags;

initially operating the configurable MACSec logic components with a configuration that positions one or more selected tags to appear before the MACSec tag in an unencrypted part of the partially encrypted packets, so that the selected tags are accessible to legacy network devices that do not support MACSec tags and layer 2 encryption;

and reconfiguring the configurable MACSec logic components, to change the positions of the selected tags, so that the selected tags appear after the MACSec tag in an encrypted part of the partially encrypted packets and are accessible to intermediate network devices that support MACSec; and operating the configurable MACSec logic components using the reconfigured positions of the selected tags, wherein the partially encrypted packets include a TCP checksum based on a TCP payload with the MACSec tag being positioned after the source and destination MAC tag and selected tags and, wherein the partially encrypted packet includes a secured data integrity checksum, and calculation of the secured data integrity checksum included the selected tags positioned before the MACSec tag.

18. The method of claim 17, further including assigning meaningful data to the selected tags for processing by intermediate network devices.

19. The method of claim 17, further including replacing the legacy network devices with intermediate network devices that do support MACSec and that are capable of line speed decryption and retrieval of tags from encrypted portions of packets.

* * * * *